United States Patent
Yankov et al.

(10) Patent No.: US 8,398,392 B2
(45) Date of Patent: Mar. 19, 2013

(54) NECK RING FOR FORMING A NECK PORTION OF A PREFORM AND THE MOLD STACK INCORPORATING SAME

(75) Inventors: Peter Yankov, Bolton (CA); Scott Michael Stedman, Mississauga (CA); Domenico Favata, Konz (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 262 days.

(21) Appl. No.: 13/005,625

(22) Filed: Jan. 13, 2011

(65) Prior Publication Data

US 2012/0183639 A1     Jul. 19, 2012

(51) Int. Cl.
*B29C 45/34* (2006.01)
*B29D 1/00* (2006.01)

(52) U.S. Cl. ......... 425/546; 249/59; 249/141; 425/812

(58) Field of Classification Search .......... 425/812, 425/533, 546; 249/59, 141
See application file for complete search history.

(56) References Cited

U.S. PATENT DOCUMENTS

| | | | | |
|---|---|---|---|---|
| 22,129 A | * | 11/1858 | Mason | 249/59 |
| 215,869 A | * | 5/1879 | Bodine | 249/59 |
| 905,044 A | * | 11/1908 | Arbogast | 249/141 |
| 1,519,586 A | * | 12/1924 | Lloyd | 249/141 |
| 1,525,126 A | * | 2/1925 | Goldstein | 249/141 |
| 2,550,140 A | * | 4/1951 | Dotson | 249/59 |
| 3,015,911 A | * | 1/1962 | Payne | 249/141 |
| 3,671,211 A | * | 6/1972 | Lloyd | 65/234 |
| 4,382,767 A | * | 5/1983 | Naugle et al. | 425/504 |
| 5,935,620 A | * | 8/1999 | Baudin | 425/522 |
| 7,128,865 B2 | | 10/2006 | Martin | |
| 2008/0026239 A1 | | 1/2008 | Balboni et al. | |

FOREIGN PATENT DOCUMENTS

| | | |
|---|---|---|
| CA | 2712417 A1 | 8/2010 |
| JP | 03199023 A * | 8/1991 |

* cited by examiner

*Primary Examiner* — Robert B Davis
(74) *Attorney, Agent, or Firm* — Husky Intellectual Property Services

(57) ABSTRACT

There is provided a neck ring for defining at least a portion of a neck portion of a preform. The neck ring comprises a body having: mounting flange and a molding face, the molding face including a venting structure, the venting structure having: (i) a plurality of air vent grooves for collecting and venting, in use, excess air from a molding cavity as it is being filled with the molding material, and (ii) an air collector groove in fluid communication with the plurality of air vent grooves for providing an evacuation path for the air to be vented from the plurality of air vent grooves.

14 Claims, 4 Drawing Sheets

US 8,398,392 B2

NECK RING FOR FORMING A NECK PORTION OF A PREFORM AND THE MOLD STACK INCORPORATING SAME

FIELD OF THE INVENTION

The present invention generally relates to, but is not limited to, molding systems, and more specifically the present invention relates to, but is not limited to, a neck ring for forming a neck portion of a preform and a mold stack incorporating same.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from Polyethylene Teraphalate (PET) material is a preform that is capable of being subsequently blown into a beverage container, such as, a bottle and the like.

As an illustration, injection molding of PET material involves heating the molding material (ex. PET pellets, etc.) to a homogeneous molten state and injecting, under pressure, the so-melted PET material into a molding cavity defined, at least in part, by a female cavity piece and a male core piece mounted respectively on a cavity plate and a core plate of the mold. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be demolded, i.e. ejected off of the core piece. Ejection structures are known to assist in removing the molded articles from the core halves. Examples of the ejection structures include stripper plates, ejector pins, etc.

When dealing with molding a preform that is capable of being blown into a beverage container, one consideration that needs to be addressed is forming a so-called "neck portion". Typically and as an example, the neck portion includes (i) threads (or other suitable structure) for accepting and retaining a closure assembly (ex. a bottle cap), and (ii) an anti-pilferage assembly configured to cooperate, for example, with the closure assembly to indicate whether the end product (i.e. the beverage container that has been filled with a beverage and shipped to a store) has been tampered with in any way. The neck portion may comprise other additional elements used for various purposes, for example, to cooperate with parts of the molding system (ex. a support ledge, etc.). As is appreciated in the art, the neck portion can not be easily formed by using the cavity and core halves. Traditionally, split mold inserts (sometimes referred to by those skilled in the art as "neck rings") have been used to form the neck portion.

With reference to FIG. 1, a section along a portion of an injection mold 50 illustrates a portion of typical molding insert stack assembly 60 that is arranged within a molding system (not depicted). The description of FIG. 1 that will be presented herein below will be greatly simplified, as it is expected that one skilled in the art will appreciate general configuration of other components of the injection mold 50 that will not be discussed in the following description.

The molding insert stack assembly 60 includes a neck ring insert pair 52 that together with a mold cavity insert 54, a gate insert (not shown) and a core insert 61 define a molding cavity (not separately numbered) where molding material can be injected to form a molded article, such as a perform 63. In order to facilitate forming of the neck portion of the preform 63 and subsequent removal of the preform 63, the neck ring insert pair 52 comprises a pair of complementary neck ring inserts that are mounted on adjacent slides of a slide pair 68. The slide pair 68 is slidably mounted on a top surface of a stripper plate 66. As commonly known, and as, for example, generally described in U.S. Pat. No. 6,799,962 to Mai et al (granted on Oct. 5, 2004), the stripper plate 66 is configured to be movable relative to a cavity plate assembly 74 and a core plate assembly (not depicted), when the mold is arranged in an open configuration, whereby the slide pair 68, and the complementary neck ring insert pair 52 mounted thereon, can be laterally driven, via a cam arrangement or some other means (not shown), for the release of the molded article from the molding cavity.

A typical neck ring insert has a body that includes a pair of projecting portions 70 that extend from a top and a bottom face of a flange portion 72 (i.e. a top projecting portion and a bottom projecting portion). Typically, the bottom face of the flange portion 72 abuts, in use, a top surface of the slide pair 68. Even though not depicted in FIG. 1, one skilled in the art will appreciate that the neck ring insert pair 52 cooperates with suitable fasteners for connecting to a respective one of the slide pair 68. In use, during certain portions of a molding cycle, the top projecting portion cooperates with a female receptacle disposed on the cavity plate assembly 74.

FIG. 2 depicts an example of a prior art implementation of a neck ring 200 of the neck ring insert pair 52. More specifically, FIG. 2 depicts a front planar view of the neck ring 200. The neck ring 200 comprises a molding surface 202 for forming, in use, various portions of the neck finish of the preform and a mating surface 204 for abutting, in use, another one of the neck ring 200. The neck ring 200 further includes a venting structure 206. The venting structure 206 comprises (i) an air vent groove 208 for collecting and venting, in use, excess air from the molding cavity as it is being filled with the molding material and (ii) an air collector groove 210 in fluid communication with the air vent groove 208 for providing an evacuation path for the air to be vented from the air collector groove 210.

US patent application 2008/0026239 published to Alessandro, et al. on Jan. 31, 2008 discloses a preform that is formed by an upper neck which maintains unchanged its form in the final object and a hollow body, joined to the neck. The method foresees the insertion, within a matrix cavity, of a metered body of polymeric material whose mass is metered according to a reference value, and the subsequent pressure insertion of a punch within the matrix cavity until it closes the mold's molding chamber, the punch conferring the shape to the inner surface of the preform and the matrix having an inner surface which confers the shape to the outer surface of the preform. According to the invention, in the molding of the preform, the error of the mass of the metered body with respect to the reference value is distributed in the hollow body, which undergoes a subsequent hot deformation until it achieves the final shape. In the mold, the matrix comprises at least one deformable wall (31) whose inner surface defines at least part of the inner surface of the matrix part intended to give form to the hollow body of the preform, said deformable wall (31) having, at least in part, a relatively thin thickness which permits it to be elastically deformed under the pressure of the polymeric material in the final preform molding step, thereby varying the thickness of the hollow body.

U.S. Pat. No. 7,128,865 issued to Martin on Oct. 31, 2006 discloses an injection molding method and apparatus for ejecting a molded plastic preform from a mold. A first lifting structure and/or step is configured to have an inner surface with an area for sealing and aligning with a complementary surface on a core, and to have an upper surface with an area for sealing and aligning with a complementary surface on a second lifting structure, said upper surface of said first lifting structure being configured to lift a molded plastic preform from the injection mold in a lifting direction for a first period of time, the lower portion of the molded plastic preform lying in a plane substantially perpendicular to the lifting direction. A second lifting structure and/or step is configured to have an inner surface configured to lift an outer surface of the molded plastic preform from the injection mold in the lifting direction for a second period of time, the outer surface of the molded plastic preform including structure lying in a plane substantially parallel with the lifting direction. Since the molded plastic preform is lifted by its end, the preform does not have to be solidified at its interior, thus allowing earlier removal of the preform from the mold, reducing cycle time.

SUMMARY OF THE INVENTION

According to a first broad aspect of the present invention, there is provided a neck ring for defining at least a portion of a neck portion of a preform. The neck ring comprises a body having: mounting flange and a molding face, the molding face including a venting structure, the venting structure having: (i) a plurality of air vent grooves for collecting and venting, in use, excess air from a molding cavity as it is being filled with the molding material, and (ii) an air collector groove in fluid communication with the plurality of air vent grooves for providing an evacuation path for the air to be vented from the plurality of air vent grooves.

According to a second broad aspect of the present invention, there is provided a neck ring pair comprising a first neck ring and a second neck ring, each for defining at least a portion of a neck portion of a preform, at least one of the first neck ring and the second neck ring, the first neck ring having: a body having: mounting flange and a molding face, the molding face including a venting structure, the venting structure having (i) a plurality of air vent grooves for collecting and venting, in use, excess air from a molding cavity as it is being filled with the molding material, and (ii) an air collector groove in fluid communication with the plurality of air vent grooves for providing an evacuation path for the air to be vented from the plurality of air vent grooves.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the embodiments of the present invention (including alternatives and/or variations thereof) may be obtained with reference to the detailed description of the non-limiting embodiments along with the following drawings, in which.

The drawings are not necessarily to scale and are may be illustrated by phantom lines, diagrammatic representations and fragmentary views. In certain instances, details that are not necessary for an understanding of the non-limiting embodiments or that render other details difficult to perceive may have been omitted.

DETAILED DESCRIPTION OF EMBODIMENTS

Figure 1:
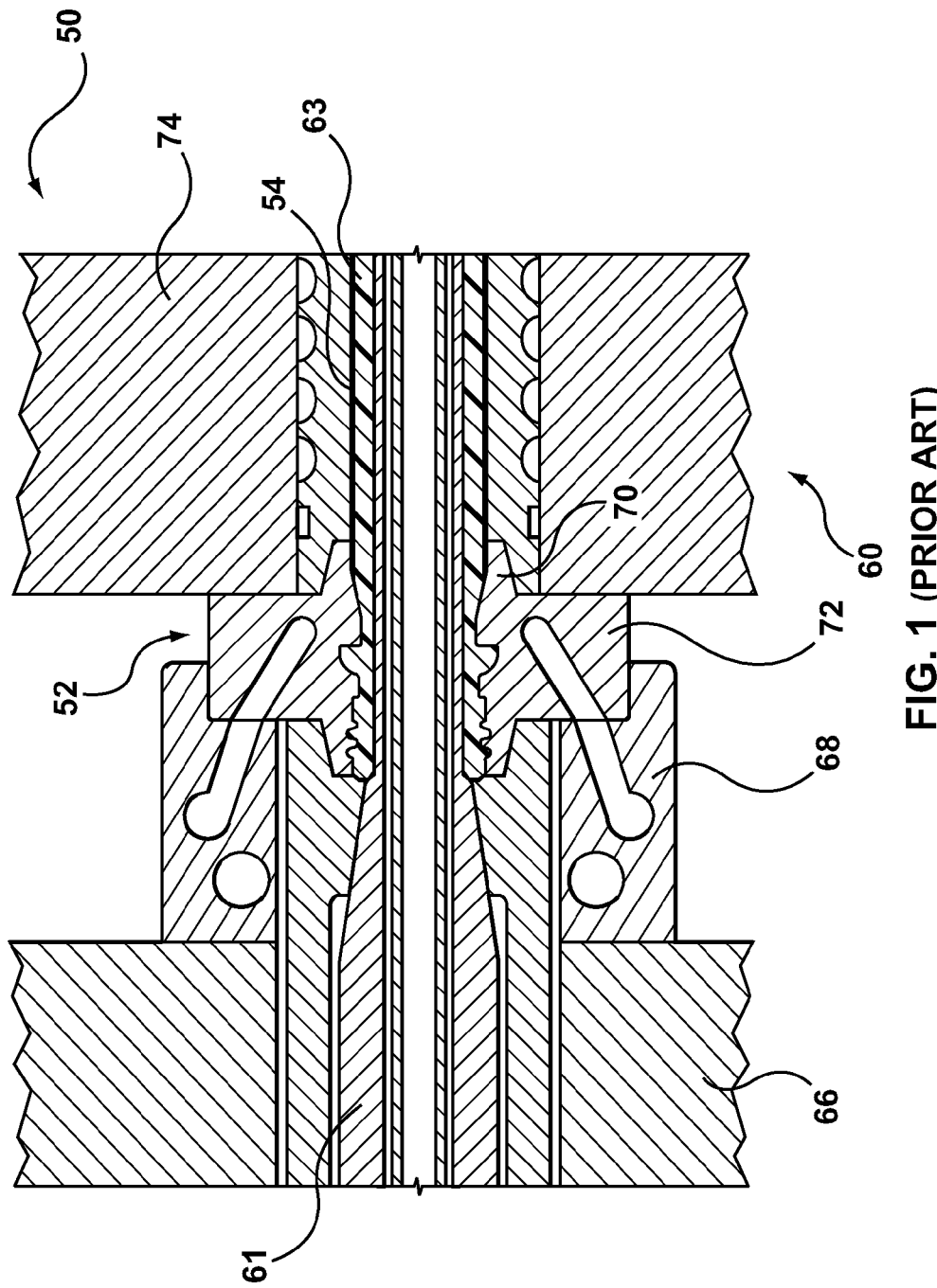
FIG. 1 depicts a cross-section along an operational axis of a molding stack implemented in accordance with know techniques.
Figure 2:
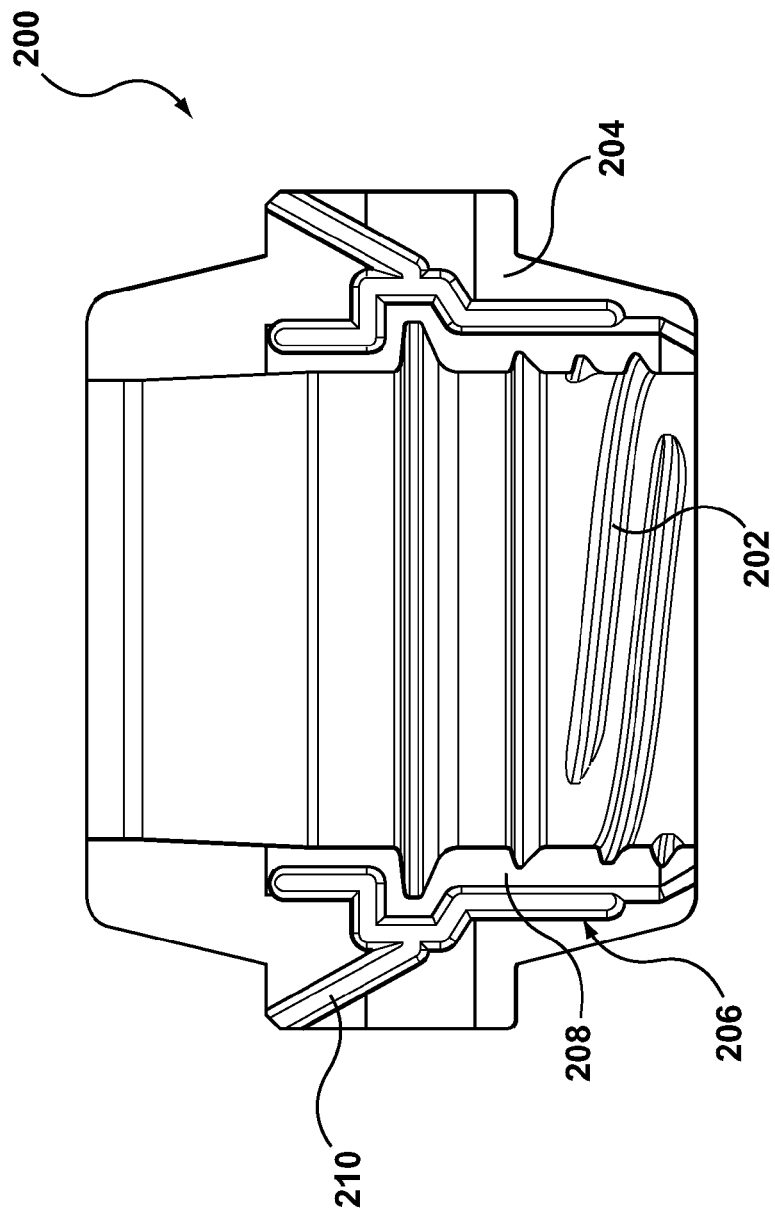
FIG. 2 is a front planar view of a neck ring of the molding stack of FIG. 1, implemented in accordance with known techniques.
Figure 3:
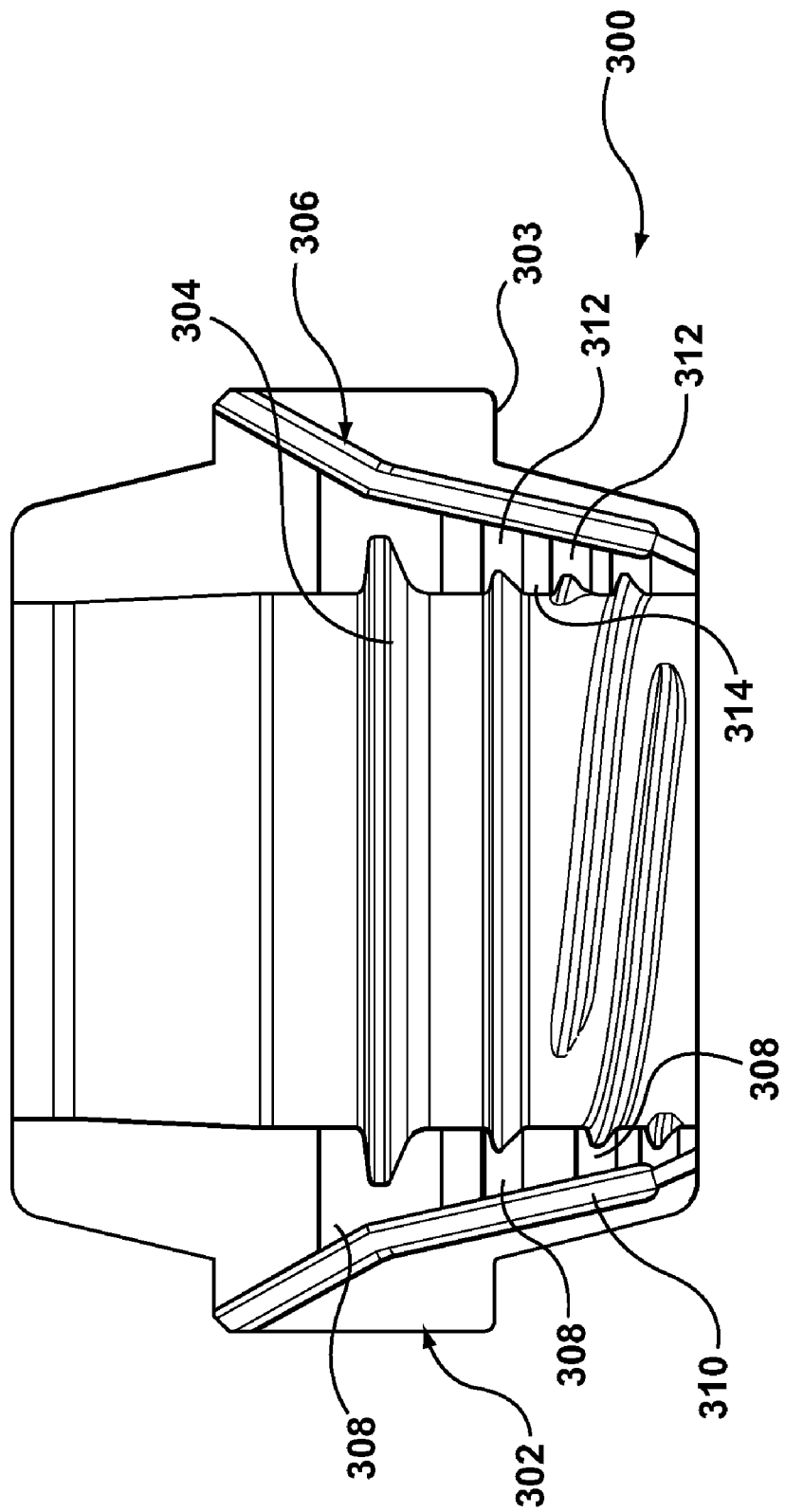
FIG. 3 is a front planar view of a split mold insert implemented in accordance with non-limiting embodiments of the present invention.

With reference to FIG. 3, a neck ring 300 is depicted, the neck ring 300 being suitable for implementation of embodiments of the present invention. FIG. 3, more specifically, depicts a front planar view thereof. The neck ring 300 is configured to mate with another neck ring (not depicted, but which would constitute a minor image of the neck ring half 302 other than for the specific differences as will be discussed below), in use, to define at least a portion of the neck portion of the preform to be molded. To that extent, the neck ring 300 comprises a neck ring body 302 (or, simply, body 302). The neck ring body 302 includes a mounting flange 303, which is configured to be mounted, in use, within a mold (not depicted), typically onto a neck ring slide (not depicted). This is achieved for example, by means of a coupling interface (not depicted), which is configured to accept, in use, a fastener (not depicted).

The neck ring body 302 further defines a molding face 304. The molding face 304 includes a molding pattern defining, in use, the desired shape of the neck portion of the preform (such as portions for defining the thread, the support ledge and the anti-pilfer indication band, all of which are not separately numbered). The neck ring body 302 further includes a cooling channel (not depicted), which is configured to be coupled, in use, to a source of cooling fluid (not depicted) via an inlet (not visible) typically located on a bottom surface of the mounting flange 303. The cooling channel penetrates the inside of the neck ring body 302 to deliver the cooling fluid into desired portions thereof, typically, relatively close to the preform being molded to affect cooling thereof, during relevant portions of the molding cycle. Several layouts of the cooling channel are known to those of skill in the art and, as such, will not be described here at any length.

The neck ring body 302 further includes a number of additional features, all known to those skilled in the art, such as tapers (not numbered), coupling interfaces (not depicted) and the like. Since of these are well-known, they will not be described here at any length.

According to embodiments of the present invention, the body 302 comprises a venting structure 306. The venting structure 306 comprises (i) a plurality of air vent grooves 308 for collecting and venting, in use, excess air from the molding cavity as it is being filled with the molding material and (ii) an air collector groove 310 in fluid communication with the plurality of air vent grooves 308 for providing an evacuation path for the air to be vented from the plurality of air vent grooves 308. It is noted that the plurality of air collector grooves 310 is defined by means of two neighboring spot air grooves 312 interrupted by a land of neck ring material 314. It is noted that at least some of the plurality of air vent grooves 308 are located at the threads and/or the support ledge defining portion of the molding face 304.

For example, a given one of the plurality of air vent grooves 308 can be located at a portion of the molding face 304 configured to define an apex of a thread. As another example, a given one of the plurality of air vent grooves 308 can be located at a portion of the molding face 304 configured to define an apex of the support ledge. Generally speaking, it can be said that a given one of the plurality of air vent grooves 308 is positioned on the molding face 304 such as to allow evacuation of the air as it is being displaced from the molding cavity as the molding materials enters the molding cavity to form the molded article, i.e. the preform.

It is noted that in the specific embodiment depicted the plurality of air vent grooves 308 comprises at least three air vent grooves. However, the exact number of the air vent grooves can be different in alternative embodiments of the present invention. Also, in the specific embodiment depicted herein a given one of the plurality of air vent grooves 308 can have a width different from another one of the plurality of air vent grooves 308. However, in alternative embodiments of the present invention, some or all of the plurality of air vent grooves 308 can be implemented with the same width.

In some embodiments of the present invention, the plurality of air vent grooves 308 and/or the air collector groove 310 can be manufactured by means of hard milling. In other embodiments, the plurality of air vent grooves 308 and/or the air collector groove 310 can be manufactured by means of grinding. Other manufacturing methods can be used, of course.

Figure 4:
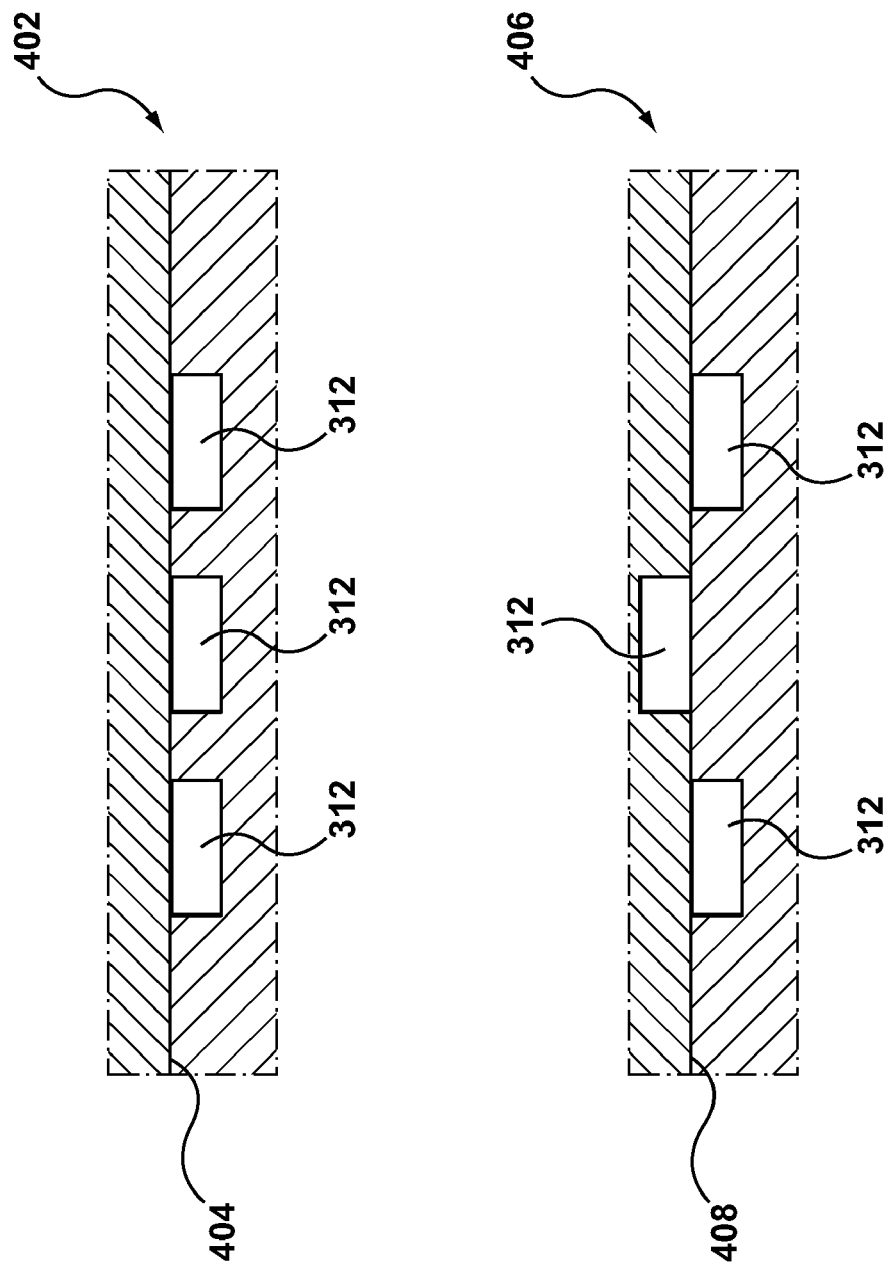
FIG. 4 is a schematic representation of various implementations of placement of the sport vent grooves within the split mold insert implemented in accordance with non-limiting embodiments of the present invention.

FIG. 4 schematically depicts two possible implementations of embodiments of the present invention. Depicted within the illustration of FIG. 4, are the neck ring pair 402 separated by a split line 404 and the neck ring pair 406 separated by a split line 408. It is noted that illustration of the neck ring pair 402 and the neck ring pair 406 schematically depict a respective non-limiting embodiment of a portion of the neck ring 300 and a mating neck ring.

Within the embodiment of the neck ring pair 402, the spot air grooves 312 are defined on one of the neck rings of the neck ring pair 402. Within the embodiment of the neck ring pair 406, the spot air grooves 312 are defined on both of the neck rings of the neck ring pair 406 in an altering staggered arrangement. In other words, within the embodiment of the neck ring pair 406 a first one of the spot air grooves 312 is located on one mating neck ring 300 and the sequentially next one is located on the other mating neck ring 300. It is noted that specific placement of the spot air grooves 312 is not particularly limited, as long as it is placed to allow for the air to escape from the required portion of the molding cavity.

It is noted that in some embodiments of the present invention, the spot air grooves 312 can be approximately 30 microns, i.e. the depth that is consistent with prior art implementations. In other embodiments of the present invention, the spot air grooves 312 can be associated with a depth that is shallower or is larger than the depth of the prior art implementation.

A technical effect of embodiments of the present invention includes ability to maintain the vent gap size more consistently throughout the life of the tool. Another technical effect of embodiments of the present invention may include ability to maintain consistent vent gap size near the molding surface despite the compression and deformation experienced by the neck rings under tonnage and taper preload forces. Another technical effect of embodiments of the present invention may include reduced stress and wear on neck ring split face due to increase in split face area. Another technical effect may include reduced potential for air vent collapse resulting from excessive neck ring taper load. It should be expressly understood that not each every technical effect needs to be present in each and every embodiment of the present invention.

The description of the embodiments of the present inventions provides examples of the present invention, and these examples do not limit the scope of the present invention. It is to be expressly understood that the scope of the present invention is limited by the claims only. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described.

Therefore, what is to be protected by way of letters patent are limited only by the scope of the following claims:

1. A neck ring for defining at least a portion of a neck portion of a preform, the neck ring comprising:
   a body having:
      mounting flange and a molding face,
      the molding face including a venting structure, the venting structure having:
         (i) a plurality of air vent grooves for collecting and venting, in use, excess air from a molding cavity as it is being filled with the molding material, and
         (ii) an air collector groove in fluid communication with the plurality of air vent grooves for providing an evacuation path for the air to be vented from the plurality of air vent grooves,
      wherein a given one of the plurality of air vent grooves has a width different from another one of the plurality of air vent grooves.

2. The neck ring of claim 1, wherein the plurality of air vent grooves is defined by at least two neighboring spot air grooves interrupted by a land of neck ring material.

3. The neck ring of claim 1, wherein a given one of the plurality of air vent grooves is defined at a portion of the molding face for defining an apex of a thread.

4. The neck ring of claim 1, wherein a given one of the plurality of air vent grooves is defined at a portion of the molding face for defining an apex of a support ledge.

5. The neck ring of claim 1, wherein a given one of the plurality of air vent grooves has a depth of approximately 30 microns.

6. The neck ring of claim 1, wherein a given one of the plurality of air vent grooves has a depth of one of less or more then approximately 30 microns.

7. The neck ring of claim 1, wherein the neck ring is one of a pair of neck ring halves and the pair of neck ring halves has a second one of neck rings, and wherein the venting structure is provided exclusively on the neck ring within the pair of neck ring halves.

8. The neck ring of claim 1, wherein the neck ring is one of a pair of neck ring halves and the pair of neck ring halves has a second one of neck rings, and wherein the plurality of air vent grooves is a first plurality of air vent grooves and wherein the second one of neck rings further comprises a second plurality of air vent grooves.

9. The neck ring of claim 8, wherein the first plurality of air vent grooves and the second plurality of air vent grooves are disposed in an altering staggered relationship vis-á-vis a split line between the pair of neck ring halves.

10. The neck ring of claim 1, wherein the plurality of air vent grooves comprises at least three air vent grooves.

11. A neck ring pair comprising:
  a first neck ring and a second neck ring, each for defining at least a portion of a neck portion of a preform, at least one of the first neck ring and the second neck ring, the first neck ring having:
  a body having:
    mounting flange and a molding face,
    the molding face including a venting structure, the venting structure having:
      (i) a plurality of air vent grooves for collecting and venting, in use, excess air from a molding cavity as it is being filled with the molding material, and
      (ii) an air collector groove in fluid communication with the plurality of air vent grooves for providing an evacuation path for the air to be vented from the plurality of air vent grooves,
    wherein a given one of the plurality of air vent grooves has a width different from another one of the plurality of air vent grooves.

12. The neck ring pair of claim 11, the venting structure is provided exclusively on the first neck ring and the second neck ring is implemented without the venting structure.

13. The neck ring pair of claim 11, wherein the plurality of air vent grooves is a first plurality of air vent grooves and wherein the second one of neck rings further comprises a second plurality of air vent grooves.

14. The neck ring pair of claim 13, wherein the first plurality of air vent grooves and the second plurality of air vent grooves are disposed in an altering staggered relationship vis-á-vis a split line between the pair of neck ring halves.

\* \* \* \* \*